United States Patent [19]
Ishida et al.

[11] Patent Number: 5,223,652
[45] Date of Patent: Jun. 29, 1993

[54] KEY AND KEYBOARD

[75] Inventors: Muneo Ishida; Mituo Yamashita, both of Shizuoka; Masanari Onishi; Masahiro Tanaka, both of Hyogo, all of Japan

[73] Assignee: Kawai Musical Instrument Manufacturing Co., Ltd., Shizuoka, Japan

[21] Appl. No.: 804,966

[22] Filed: Dec. 11, 1991

[30] Foreign Application Priority Data

Dec. 25, 1990 [JP] Japan .................... 2-405946

[51] Int. Cl.$^5$ ............................. G10C 3/12
[52] U.S. Cl. .......................... 84/427; 106/177; 106/178; 106/180; 106/196; 106/204; 84/433; 84/452 P
[58] Field of Search .......... 84/427, 433, 452 R, 84/452 P; 106/177, 178, 180, 196, 204

[56] References Cited

U.S. PATENT DOCUMENTS 4,840,104  6/1989  Ishida et al. ................. 84/437

OTHER PUBLICATIONS

Hawley, *Condensed Chemical Dictionary*, Van Nostrand Reinhold, 1974, p. 168.
*Hercules Cellulose Acetate*, Hercules Powder Company, Wilmington, Del., 1943.

*Primary Examiner*—David Brunsman
*Attorney, Agent, or Firm*—Flynn, Thiel, Boutell & Tanis

[57] ABSTRACT

A black key making of a resin composition comprising a cellulose derivative resin, silicon oxide and at least 0.3 part by weight of a carbon black based on 100 parts by weight of the cellulose derivative, the carbon black having a pH of 6 and below and a BET specific surface area of 260 m$^2$/g and above, a keyboard comprising white keys and above-described black keys and a musical instrument having the above-described keyboard are disclosed. The black key is excellent in productivity and processability and is hygroscopic and excellent in the touch to fingers during playing. The black key is preferably made by injection molding.

8 Claims, 1 Drawing Sheet

KEY AND KEYBOARD

FIELD OF THE INVENTION

The present invention relates to a black key comprising a molded article of a cellulose derivative resin composition containing a specified carbon black and silicon oxide, a keyboard comprising the black keys and a musical instrument having the keyboard.

DESCRIPTION OF THE RELATED ART

Generally, ebony, acrylic resin, phenol resin or AS (acrylonitrile-styrene) resin has been used as a raw material for producing a black key of keyboarded musical instruments such as a piano, an accordion, an organ, an electronic musical instrument and a keyboard.

Ebony which is a natural material can give a key which exhibits suitable hygroscopicity and suitable surface hardness, is excellent in the touch to fingers during playing and has an excellent appearance, so that it is easy of touch control and is rated high as a key material. However, it is difficultly available from the standpoint of the conservation of resources and necessitates many steps for its processing.

Therefore, a molded article of an acrylic resin, a phenol resin or a AS resin is used as a key for general-purpose keyboards. However, a key made of such a resin is uncomfortable to the touch to fingers and is liable to become slippery with sweat because of its poor hygroscopicity. Further, the key made of such a resin has a surface hardness higher than that of ebony. Therefore, it is difficult of touch control when the keyboard comprising the key made of such a resin is used. Furthermore, dust is liable to adhere to the surface of the key because the resin causes static-charge buildup.

SUMMARY OF THE INVENTION

The present invention has been made in order to overcome these disadvantages and its object is to provide a black key which has ebony-like properties of being hygroscopic and soft to the touch and is excellent in productivity and processability.

The inventors of the present invention have intensively studied to attain the above object with their attention being paid to a cellulose derivative resin which is inherently hygroscopic, good to the touch, tough and excellent in processability and have found that a key which is equivalent to ebony, i.e., one which exhibits improved hygroscopicity and has excellent surface hardness and attractive color tone, can be made of a resin composition comprising a cellulose derivative resin, silicon oxide as a hygroscopic inorganic filler and a specified carbon black. The present invention has been accomplished on the basis of this finding.

Namely, the present invention provides a black key comprising a molded article of a resin composition comprising a cellulose derivative resin, silicon oxide and at least 0.3 part by weight of a carbon black based on 100 parts by weight of the cellulose derivative, the carbon black having a pH of 6 and below and a BET specific surface area of 260 m$^2$/g and above.

The resin composition which comprises from 0.3 to 1.0 part by weight of the carbon black and from 2 to 10 parts by weight of silicon oxide based on 100 parts by weight of the cellulose derivative is preferable.

The resin composition which further comprises from 20 to 50 parts by weight of a plasticizer based on 100 parts by weight of the cellulose derivative and a thermal stabilizer is preferable.

The present invention provides a keyboard comprising white keys and the above-described black keys.

The present invention provides a musical instrument having the above-described keyboard.

DETAILED DESCRIPTION OF THE INVENTION

Figure 1:
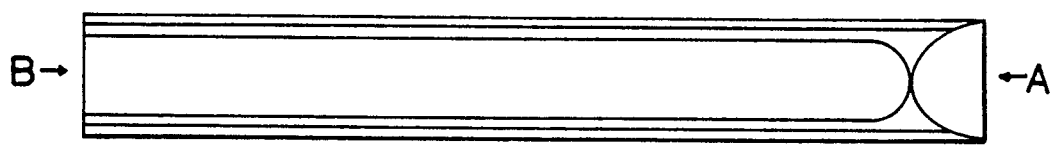
FIG. 1 is a plan view of a black key for a piano according to the present invention.

The cellulose derivative resin to be used in the present invention includes cellulose acetate resin, cellulose acetate propionate resin and cellulose acetate butyrate resin, among which cellulose acetate resin is preferable.

The cellulose acetate resin is generally used with a plasticizer and representative examples of such a plasticizer include dimethyl phthalate, diethyl phthalate, dibutyl phthalate, dimethoxyethyl phthalate, ethylphthalyl ethyl glycolate, triacetin and tricresyl phosphate, among which dimethyl phthalate, diethyl phthalate and dibutyl phthalate are mainly used. It is most desirable for injection molding that the amount of the plasticizer in a resin composition is 20 to 50 parts by weight based on 100 parts by weight of the cellulose acetate flakes used as the raw material. When the amount of the plasticizer added is smaller than 20 parts by weight, the resulting material i.e. the resin composition will be too poor in fluidity to be easily injection-molded and will necessitate such a high molding temperature as to cause the deterioration and coloration of the resin. On the contrary, when the amount exceeds 50 parts by weight, the resin composition itself will be too flexible, though its fluidity and moldability will be improved. Therefore, a large amount of carbon must be added to the resin composition in order to enhance the hardness, which will bring about a remarkable lowering in the thermal stability of the resin composition, so that the resin itself and the resin composition will deteriorate or discolor, and the resin composition will be poor in impact strength or will fail in molding. Accordingly, a resin composition comprising a cellulose acetate resin and a plasticizer in such a large amount is unsuitable for the production of a key.

The silicon oxide to be used in the present invention is preferably an amorphous silica comprising finely powdered silicon oxide as a main component. It may be added to a cellulose derivative resin composition in an amount of 2 to 10 parts by weight, preferably 3 to 6 parts by weight based on 100 parts by weight of a cellulose derivative resin to improve the hygroscopicity of the resin composition. When the amount of the silicon oxide added exceeds 10 parts by weight, the resulting resin composition will be too highly opacified and whitened to be colored deeply black with a black pigment or dye and the molded article made therefrom will be poor in surface gloss and impact strength, though its hygroscopicity and surface hardness will be high. Accordingly, a cellulose derivative resin composition containing silicon oxide in such a large amount will be unsuitable for the production of a key. On the contrary, when the amount is smaller than 2 parts by weight, the molded article made of the resulting resin composition will be unfavorably poor in hygroscopicity and surface hardness.

The carbon black to be used in the present invention must have a pH of 6 and below and a BET specific surface area of 260 m$^2$/g and above. The pH value in this specification is one determined according to JIS K 5101. When the pH is too high, the resulting cellulose derivative resin composition will be so poor in thermal stability that the melt viscosity of the resin composition will be reduced as not to exhibit normal physical characteristics in heat-molding, thus failing in giving a molded article. Further, the BET specific surface area in this specification is one determined based on the amount of gaseous nitrogen adsorbed according to the BET method and the method of measurement thereof is stipulated in ASTM D-3037.

In order to attain deep blackness, the use of a channel black having a BET specific surface area of 320 m$^2$/g and above is most desirable. Such a channel black overwhelms the whiteness attained by silica and serves to enhance the surface hardness of the molded article made of a cellulose derivative resin composition containing the channel black in some desirable cases. The amount of the carbon black to be added to a cellulose derivative resin composition is 0.3 part by weight and above, preferably 0.3 to 1 part by weight based on 100 parts by weight of a cellulose derivative resin. When the amount is smaller than 0.3 part by weight, any deep blackness will not be attained.

Further, a cellulose derivative resin composition comprising a cellulose derivative resin, silica and the above carbon black may further suitably contain the conventional heat stabilizer for preventing the thermal degradation which is selected from among weak organic acids, epoxides, phosphites, thio ether phosphites, phenol derivatives, thiophosphites, imidazolamine derivatives, metal soaps and so on, an ultraviolet absorber selected from among triazoles and hindered amine compounds and so on and/or a dye or a pigment each in the conventional amount.

The process for producing the key according to the present invention is suitably injection molding, though the key can be produced by other known process, e.g., one which comprises molding the raw material (the cellulose resin composition) into a sheet by extrusion or compression and cutting the sheet and/or combining the sheet with other resin or wood.

The appearance and touch to fingers of the key according to the present invention can be further improved by graining the surface of the molded article of the resin composition.

The keyboard of the present invention comprises the above-described black keys and conventional white keys. And the keyboard is produced by using the black key, the white key and others as keyboard materials.

Furthermore, the musical instrument of the present invention has the above-described keyboard as an element.

As described above, the key according to the present invention is one comprising a molded article of a cellulose derivative resin composition comprising a cellulose derivative resin, a specific carbon black and silicon oxide. The resin composition according to the present invention as well as the conventional phenol resin composition can be easily and efficiently molded into a key or a key material and by virtue of the simultaneous use of the carbon black and silicon oxide, the obtained key is more hygroscopic than the one made of a phenol resin composition and exhibits enhanced surface hardness and deepened blackness and is more excellent in the touch to fingers during playing as compared with a key made of a natural ebony.

The present invention will now be further described by referring to the following Example, though the present invention is not limited thereto.

EXAMPLE 1

100 parts by weight of cellulose acetate flakes, 27 parts by weight of a phthalate plasticizer, a heat stabilizer component comprising 0.4 part by weight of an epoxide, 0.4 part by weight of an alkyl phosphite and 0.2 part by weight of a thioether compound, 5 parts by weight of an amorphous silica (mean diameter: 3.5$\mu$) as the silicon oxide, 0.5 part by weight of a channel black having a pH of 2.5 and a BET specific surface area of 460 m$^2$/g, and 0.08 part by weight of an orange dye were stirred and mixed together with a universal stirring-mixing machine at 80° C. for 4 hours, while drying them so as to lower the water content to 0.2% and below. The obtained mixture was melt-kneaded at 220° C., extruded and pelletized with an extruder having a diameter of 40 mm.

Figure 2:
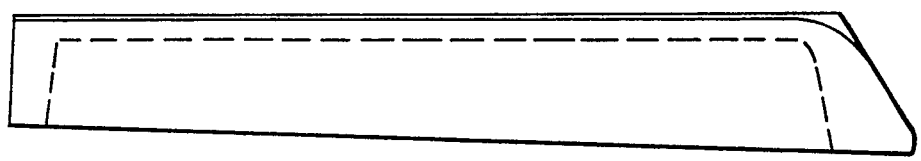
FIG. 2 is a side view of a black key for a piano according to the present invention.
Figure 3:
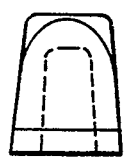
FIG. 3 is a front view of a black key for a piano according to the present invention taken from the direction A of FIG. 1.
Figure 4:
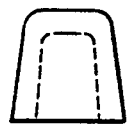
FIG. 4 is a front view of a black key for a piano according to the present invention taken from the direction B of FIG. 1.

The obtained pellets were injection-molded into a piano key having a shape shown in FIGS. 1 to 4. Separately, piano keys each having a similar shape were made by using ebony or a phenol resin. These keys were examined according to JIS K 6791.

The results are given in Table 1.

TABLE 1

| Item | Characteristic values | | |
|---|---|---|---|
| | Rockwell hardness (M scale) | water absorption (%) | specific gravity |
| Example 1 | 109 | 3.2 | 1.30 |
| Comp. Ex. | | | |
| ebony | 55 | 11~13 | 1.10 |
| phenol resin | 123 | 1.2 | 1.42 |

As can be understood from the results given in the Table 1, the key according to the present invention has a surface hardness (Rockwell hardness) near to that of a key made of a phenol resin and is improved in hygroscopicity.

Further, keyboards for a piano were made by using above-described keys respectively. The keyboard according to the present invention is massive, has a surface hardness higher than that of a keyboard made of ebony, is excellent in the touch to fingers, and is easy of touch control.

We claim:

1. A black key for a keyboard musical instrument comprising a molded article of a resin composition comprising 100 parts by weight of a cellulose ester resin capable of being molded to form the key, from 2 to 10 parts by weight of silicon oxide and from 0.3 to 1 part by weight of a carbon black, said carbon black having a pH of not higher than 6 and a BET specific surface area of at least 260 m$^2$/g.

2. The black key according to claim 1, in which the resin composition further comprises from 20 to 50 parts by weight of a plasticizer based on 100 parts by weight of the cellulose and a thermal stabilizer.

3. A black key as claimed in claim 1 in which said cellulose ester resin is selected from the group consisting of cellulose acetate, cellulose acetate propionate and cellulose acetate butyrate.

4. A keyboard comprising white keys and black keys, the black keys comprising molded articles of a resin composition comprising 100 parts by weight of a cellulose ester resin capable of being molded to form the keys, from 2 to 10 parts by weight of silicon oxide and from 0.3 to 1 part by weight of a carbon black, said carbon black having a pH of not higher than 6 and a BET specific surface area of at least 260 $m^2/g$.

5. A keyboard comprising white keys and black keys, the black keys comprising molded articles of a resin composition comprising 100 parts by weight of a cellulose ester resin capable of being molded to form the keys, from 2 to 10 parts by weight of silicon oxide and from 0.3 to 1 part by weight of a carbon black, said carbon black having a pH of not higher than 6 and a BET specific surface area of at least 260 $m^2/g$, in which the resin composition further comprises from 20 to 50 parts by weight of a plasticizer based on 100 parts by weight of the cellulose ester and a thermal stabilizer.

6. A musical instrument having a keyboard comprising white keys and black keys, the black keys comprising molded articles of a resin composition comprising 100 parts by weight of a cellulose ester resin capable of being molded to form the keys, from 2 to 10 parts by weight of silicon oxide and from 0.3 to 1 part by weight of a carbon black, said carbon black having a pH of not higher than 6 and a BET specific surface area of at least 260 $m^2/g$.

7. A musical instrument having a keyboard comprising white keys and black keys, the black keys comprising molded articles of a resin composition comprising 100 parts by weight of a cellulose ester resin capable of being molded to form the keys, from 2 to 10 parts by weight of silicon oxide and from 0.3 to 1 part by weight of a carbon black, said carbon black having a pH of not higher than 6 and a BET specific surface area of at least 260 $m^2/g$, in which the resin composition further comprises from 20 to 50 parts by weight of a plasticizer based on 100 parts by weight of the cellulose ester and a thermal stabilizer.

8. A black key for a keyboard musical instrument, which comprises: a molded article made of a composition consisting essentially of a mixture of 100 parts by weight of cellulose resin selected from the group consisting of cellulose acetate, cellulose acetate propionate and cellulose acetate butyrate, from 3 to 6 parts by weight of amorphous silica, from 0.3 to 1 part by weight of carbon black having a pH of not higher than 6 and a BET specific surface area of at least 320 $m^2/g$, and 20 to 50 parts by weight of a plasticizer for said resin.

* * * * *